XR 3,842,197

X 3050 Y

United State

Broussaud et al.

[11] 3,842,197

[45] Oct. 15, 1974

[54] FLEXIBLE HOLOGRAPHIC RECORD DISC REPRODUCING SYSTEM

[75] Inventors: Georges Broussaud; Erich Spitz, both of Paris, France

[73] Assignee: Thomson-CSF, Paris, France

[22] Filed: Feb. 7, 1972

[21] Appl. No.: 224,121

[30] Foreign Application Priority Data

Feb. 8, 1971 France .............................. 71.04134

[52] U.S. Cl.......... 178/6.7 A, 178/7.6, 178/DIG. 28, 179/100.3 G, 179/100.3 V, 350/3.5, 360/102

[51] Int. Cl............................ H04n 5/86, G11b 7/00

[58] Field of Search........ 178/6.7 R, 6.7 A:DIG. 28, 178/7.1, 7.6, 7.4; 179/100.3 G, 100.3 V, 100.2 P; 340/174.1 E; 350/3.5; 360/102

[56] References Cited

UNITED STATES PATENTS

| | | | |
|---|---|---|---|
| 3,603,742 | 9/1971 | Schuller | 179/100.2 P |
| 3,627,916 | 12/1971 | Bestenreiner | 179/100.3 V |
| 3,746,783 | 7/1973 | Gerritsen et al. | 178/6.7 A |
| 3,770,886 | 11/1973 | Kielme | 178/6.7 R |

*Primary Examiner*—Raymond F. Cardillo, Jr.
*Attorney, Agent, or Firm*—Cushman, Darby & Cushman

[57] ABSTRACT

A flexible disc is provided on at least one face of which an image is recorded along a spiral track in heliographic form. Under the action of a monochromatic light beam this image is obtained as a floating image. An arrangement is provided for playing back such discs. The invention is particularly applicable to television.

12 Claims, 9 Drawing Figures

3842197
NO OR CLASSIF

FLEXIBLE HOLOGRAPHIC RECORD DISC REPRODUCING SYSTEM

The present invention relates to the recording and reproduction of electrical signals on a base constituted by a flexible disc or record. It also relates to devices for constructing a flexible disc and reproducing from said disc, whether it concerns any electrical signals or more partilarly television signals.

Among the presently available information storing methods, the method based on the holographic technique has the advantage over conventional optical methods of permitting the utilization of a print in relief. This print is easily reproducible by the pressing of sheet material and can accept, with no damage to the information contained therein, dust and scratching which would render any other method, having a comparable storage capacity, unutilizable.

Known information storage systems employing the holographic technique are based on the splitting up of the recorded signal into distinct sections; the strict sequence of these sections can only be re-established with a relatively complicated reproducing apparatus. This is the case for example when the holographic technique is applied to the recording of a sequence of images, since these images must be reproduced by receiving them one after the other on the target of an analyzing tube of the vidicon type. The analysis of the signal sections may also be simplified by disposing them in a network of interrupted parallel lines, but such a network is nonetheless delicate to produce and reproduce.

To overcome the drawbacks resulting from the splitting up of the stored signal into sections, the system of storage by the engraving of a groove coiled into a spiral has been improved. However, this system is derived from the phonographic recording technique and possesses the same drawbacks, that is, a limitation of the density of the stored information and a relatively rapid wear of the engraved groove and of the reproducing point which travels along this groove.

An object of the present invention is to provide a system for recording and reproducing electrical signals which employs the holographic technique to form on a flexible disc a print which is capable of projecting, when suitably illuminated the image of a spiral-shaped track, this continuous track being reproduced by a punctual photoelectric transducer which is adapted to follow its trace in the course of the rotation of the disc.

On account of the good frequency performance of opto-electrical detectors and the high storage density allowed by the holographic technique, the system according to the invention is of particular interest in the storage of video frequency signals to be fed to a household television receiver. In its application to television, the recording and reproducing system is so designed that any accidental deviation of the optical recording head from the track does not noticeably disturb the television image and the operational synchronism of the screen-scanning device of the television set.

A better understanding of the invention will be had from the ensuing description with reference to the accompanying drawings in which.

Figure 1:
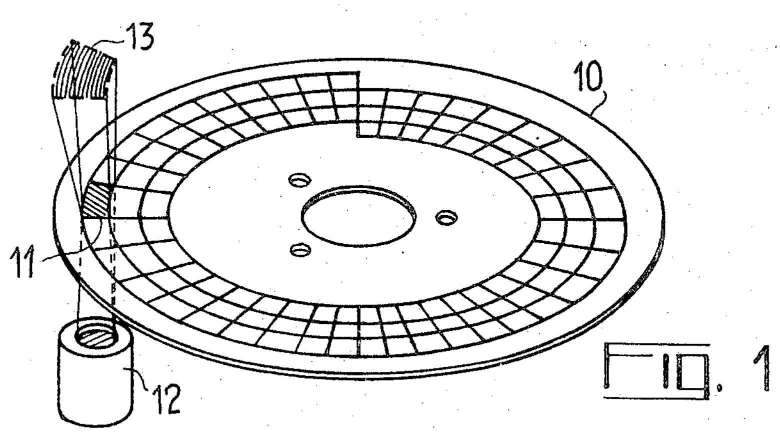
FIG. 1 is a perspective view of an information support disc or record according to the invention.

The recording and reproducing or reading system according to the invention comprises means for producing and utilizing an information support in the form of a flexible disc or record.

At least one face of this disc carries a print constituted by a succession of small holograms disposed in a spiral around the centre of the disc. This disc, shown in FIG. 1, comprises a base 10 whose centre portion has a centering aperture and driving apertures whereby the disc can be mounted on a rotary spindle provided with driving pins. The upper face of the base 10 carries a print constituted by a mosaic of small holograms 11 which are in juxtaposed relation, with possibly a slight overlapping, so as to constitute a coil in the form of a spiral around the centering aperture of the support 10. Each element of the mosaic constituting the print of the disc is designed to project, when it is illuminated by a source of monochromatic radiation 12, an image 13 which floats above the print. The image 13 is in the form of a network of equidistant lines representing a portion of the spiral track. This spiral track is completely projected above the disc when the whole of the print is illuminated. However, when employed in the disc reproducing apparatus, it is sufficient to reconstruct at each instant only a very small portion thereof. The holograms 11 are arranged, as will be understood hereinafter, to project the floating image of a spiral track having a pitch of a few microns.

Figure 2:
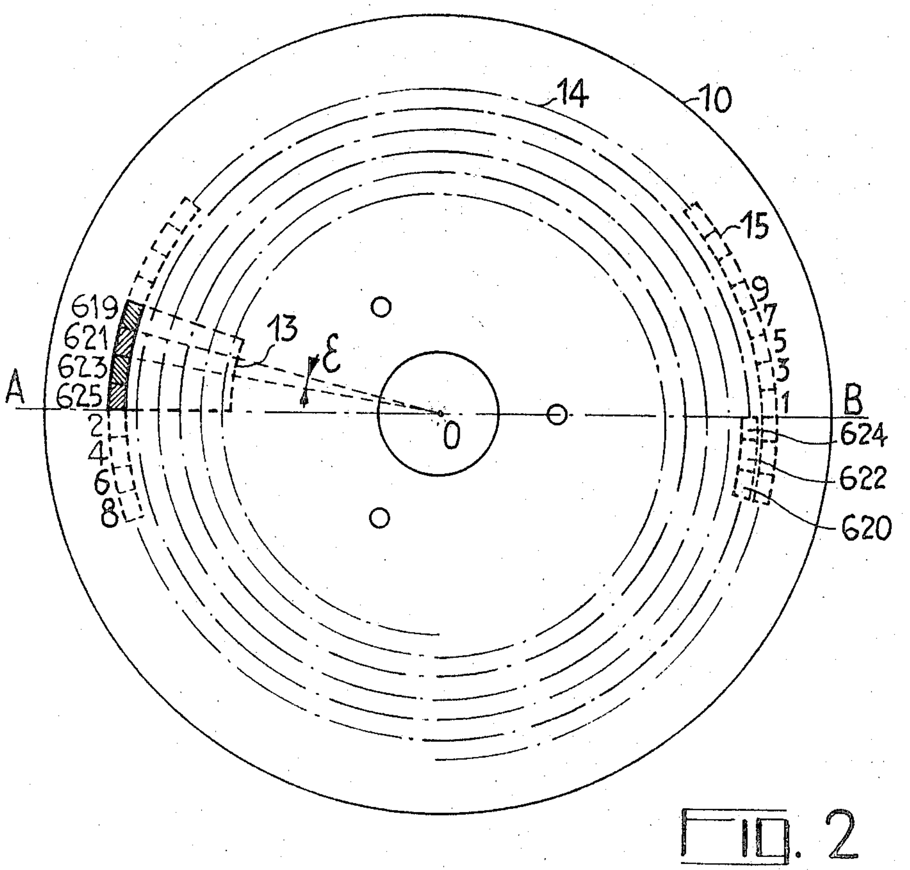
FIG. 2 is a plan view showing the arrangement of the electrical signals along the track projected by the disc shown in FIG. 1.

In travelling along this track at constant angular velocity, a punctual radiation detector provides a distribution of amplitudes which is representative of the stored electrical signals. Another track of identical shape to the first track can be projected by the same holograms, for example nearer the disc, so as to provide, as will be understood hereinafter, means for precisely guiding the upper track-exploring device. Moreover, this other track may have an optical modulation which characterizes another form of recorded signal. FIG. 2 shows in plan the support 10 in which a dot-dash line 14 represents the curved axis of a spiral track, as it is projected by the print of the flexible disc. The pitch of the spiral 14 and the thickness of the track have been much exaggerated in FIG. 2 in order to reveal more clearly the spires and the localization of the successive sections of the stored electrical signals.

When the disc 10 is intended to store television signals, the invention provides an arrangement of the sections of the video signal between two line synchronization pulses and corresponding to a given line of the television field, which is such that they are located on successive spires of the spiral 14 and in a sector having an angular extend of ε. Under these conditions, a radial deviation of the track reproducing system amounts to substituting for the analysis of one line of the television image that of another line whose content is substantially the same; this particular arrangement renders deviations of small extent unnoticeable. Moreover, the scanning frequencies of the receiver employed jointly with the reproducing apparatus are unmodified, even in the event of an accidental jump across several spires.

By way of a nonlimitative example, there has been shown in FIG. 2 a manner of distributing the sections 15 of television signals corresponding to the standard European system of 625 lines. In this system, each television image has two interlaced fields transmitted alternately at the rate of 50 semi-images per second.

The odd fields include the odd lines 1, 3, 5, 7, 9 . . . 621, 623 and 625; they are embodied on the disc shown in FIG. 2 by the portions 15 aligned on the track 14 above the diameter AB; the radius OB indicates the start of the recording of the odd fields.

The even fields include the lines 2, 4, 6, 8 . . . , 620, 622 and 624; they are aligned on the disc shown in FIG. 2 below the diameter AB, the radius OA indicating the start of these fields. When the disc rotates in the clockwise direction at the rate of 25 rps, it can be easily seen that a reproducing system controlled to follow the spiral 14 by sliding along the diameter AB scans or explores in the normal order the successive lines and fields of the television signal. If the track reproducing system suddenly changes spire, the system passes from one line of row *n* to another line of row *n;* this does not alter in a visible manner the image reproduced by the television receiver connected to the reproducing system.

The arrangement described hereinbefore assigns to each field or semi-image a sector having an angular extent of 180° on the disc. Consequently, the disc must rotate at 1,500 rpm in the course of reproduction. This speed of rotation may also be divided by assigning to each field a sector whose angular extent is a submultiple of 180°.

Figure 3:
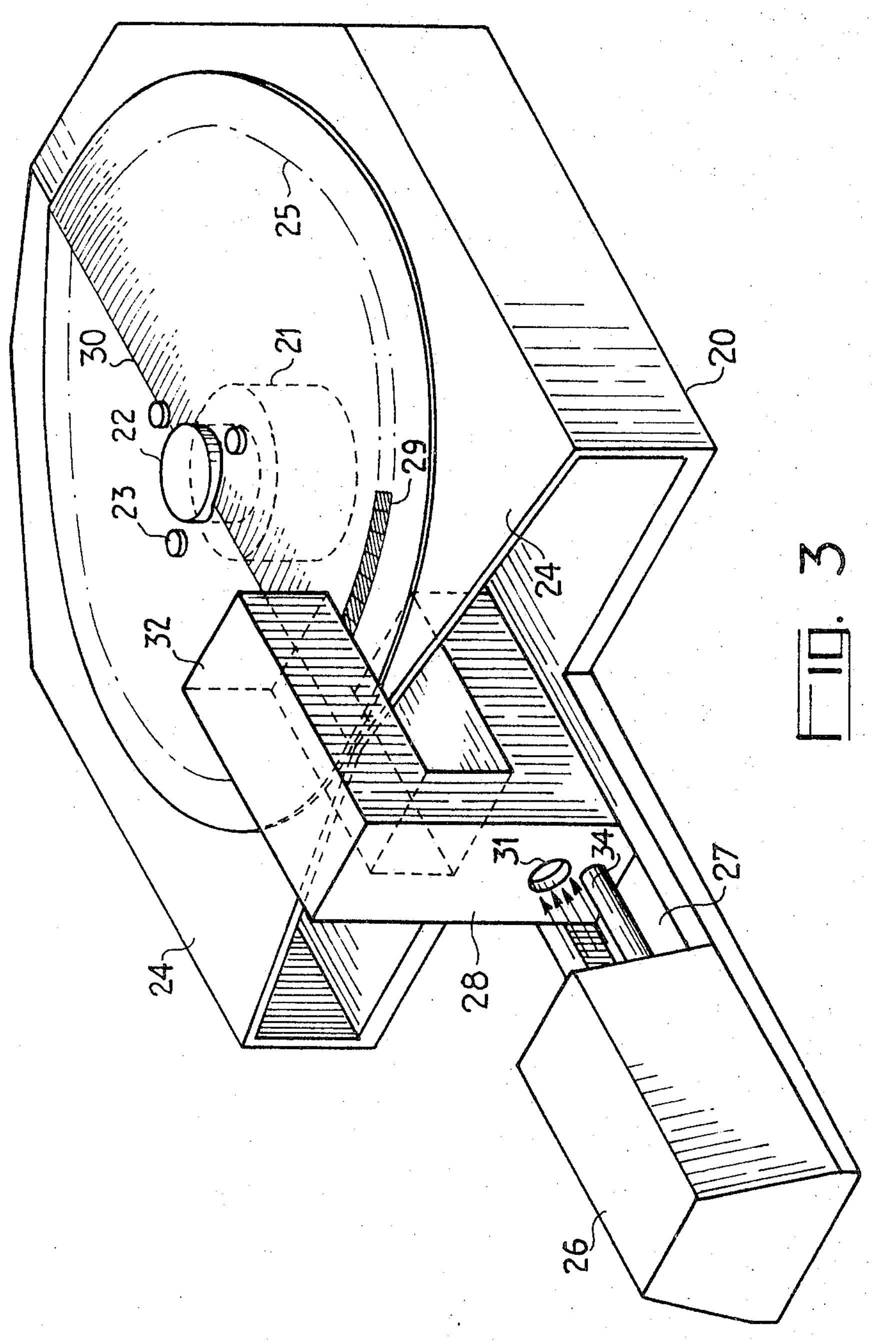
FIG. 3 is a perspective view of a reproducing deck for reproducing the electrical signals stored on the disc shown in FIG. 1.

FIG. 3 shows by way of a non-limitative example a reproducing deck of utility for reproducing the electrical signals stored on a flexible disc according to the invention.

This reproducing deck comprises a stand 20, a drive motor 21 having its frame integral with the stand 20, and a parallel bench 27 which is also integral with the stand 20.

The upper part of the stand 20 consists of a roof having two sloping sides 24 of small inclination. A flexible disc or record 25 is placed on the ridge 30 of the roof and the outer faces of the sides 24. This disc 25 is centered on the rotary spindle 22 of the motor 21 and is driven at a constant speed of rotation by the motor 21 through the agency of pins 23 provided on the spindle 22.

In the course of its rotation, the disc 25 is applied against the faces 24 of the top of the reproducing deck and slides on these faces. Owing to the forces of cohesion which are created between the disc and the sliding faces of the deck when the disc rotates, an intimate contact is achieved along the edge or ridge 30 which ensures that the spiral of holograms 29 carried by the disc 25 has a height of travel above the base of the reproducing deck which is strictly constant.

The reproducing or pickup arm for the holograms 29 is shown in FIG. 3 in the form an arch-shaped element 28 which is movable on the guide bench 27 integral with the stand of the reproducing deck. In the case of the arrangement shown in FIG. 3, to which the invention is not intended to be limited, the upper arm 32 of the element 28 encloses the electro-optical system for reproducing the spires projected by the holograms 29. the lower arm 33 of the element 28 contains an illuminating device which receives through an opening 31 a coherent radiation emitted by a source of monochromatic radiation 26. The element 28 is fed forward by a micrometer screw 34 whose rotation is related to that of the spindle 22. In the case of the arrangement shown in FIG. 3, the displacement of the element 28 is a radial displacement with respect to the disc 25 and for each revolution of the latter, the advance or feed is equal to the pitch of the spiral projected by the holograms 29 when the latter are illuminated by the source of light 26.

Without departing from the scope of the invention, the source 26 may also radiate its light to the element 28 through an opening formed in the arm 33 opposite the opening 31. In this case the source 26 is located inside the stand 20 and this reduces the overall size of the reproducing deck.

Further, FIG. 3 shows a reproducing deck illuminating the disc from below. The disc 25 then carries a single print of the upper face and is composed of a material transmitting the incident radiation. When the disc carries reflecting prints on both faces, the lower arm 33 becomes superfluous and the illuminating means contained therein are then mounted in the upper arm 32 of the element 28.

For the purpose of following the spiral-track projected by the disc 25, it is also possible to provide a reproducing or pick-up arm which pivots above the disc 25.

In this case, the ridge 30 is no longer a rectilinear ridge, but a curvilinear ridge to correspond to the path of the free end of the arm.

In the case of the reproduction of television signals, it should be mentioned that the reproducing arm 28 can be driven by the spindle 22 with a different speed ratio or this drive can be de-clutched, according as it is desired to slow down or stop the image. The speed of rotation of the spindle 22 must be synchronous with the scanning rate of the television set to which the reproducing deck is connected; this condition can be satisfied for example by employing a synchronous electric motor 21 which is supplied with power by the ac mains suppying the television set.

Figure 4:
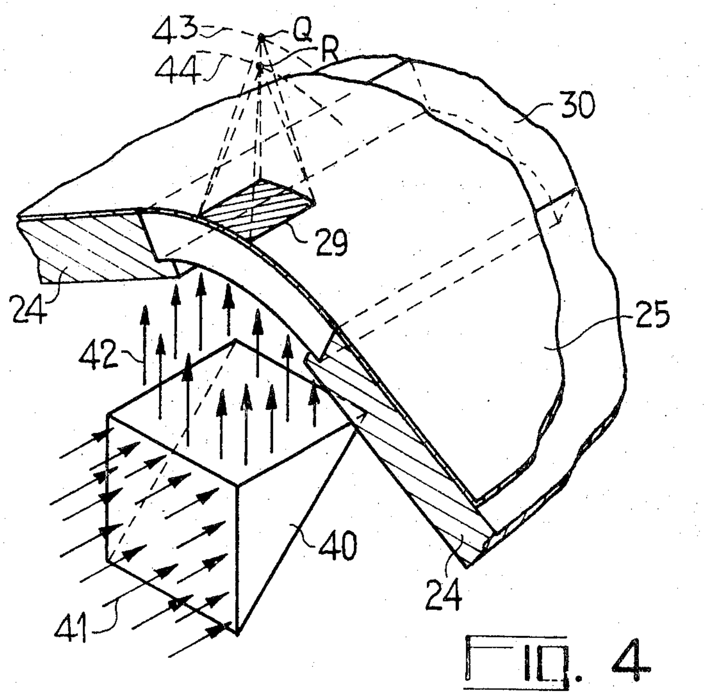
FIG. 4 is a partial perspective view of the ridge of the reproducing deck shown in FIG. 3.

A constructional detail of the reproducing deck shown in FIG. 3 can be seen in FIG. 4. This detail is located in FIG. 3 between the arms of the element 28. FIG. 4 shows the disc 25 carrying the holograms 29, the sloping faces 24 on which the disc 25 slides and the ridge 30 which is defined by the faces 24 of the roof of the reproducing deck. A prism 40 integral with the lower arm 33 of the element 28 receives the monochromatic radiation 41 given out by the source 26 and transmits toward the ridge 30 a radiation 42 adapted to illuminate the hologram 29 from below the disc 25.

As shown in FIG. 4, the ridge 30 of the reproducing deck is a cylindrical lens whose upper face defines the curvature which the disc 35 and the hologram 29 assume in the reproducing stage. The lower face of the lens 30 is formed in such manner as to correct the shape of the wave surfaces of the radiation 42 so that the hologram 29 is able to project, notwithstanding its curvature, the spire portions 44 and 43 which contribute to form the guide and signal storing racks.

It may now be mentioned that the radiation received by the hologram 29 is a monochromatic radiation having a good spatial coherence and for which there exists a radiation detector capable of responding to rapid fluctuations in the intensity of the radiation along the tracks 43 and 44. By way of non-limitative example, the radiation 41 may be a light radiation from a laser.

The hologram 29 shown cross-hatched in FIG. 4 comprises interference fringes capable of forming by diffraction partial images 43 and 44 corresponding to the light traces. The reproduction of these light traces is effected at points Q and R where the fractions of diffracted light energy converge as shown in FIG. 4.

The pressing of a disc or record according to the invention requires the construction of a die whose plane surface has interference fringes in relief. These fringes are transposed onto a flexible base capable of keeping the print of the die.

Figure 5:
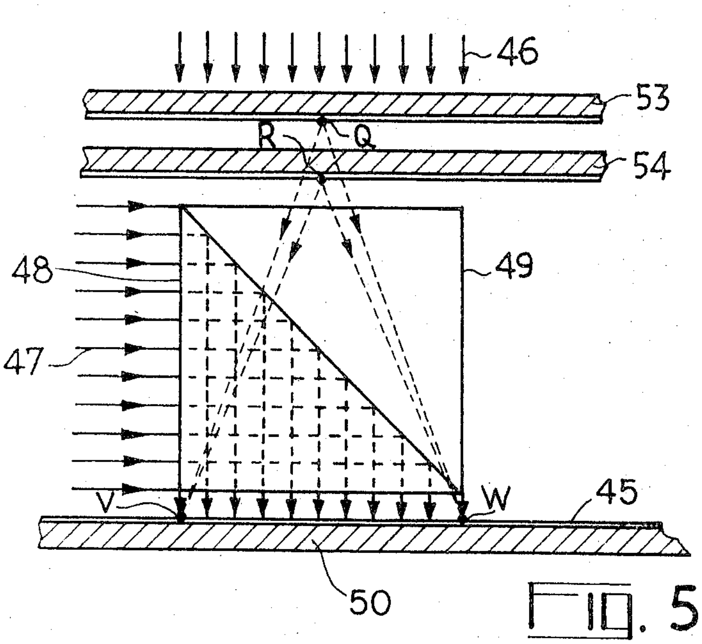
FIG. 5 illustrates a recording arrangement.

A schematic of an optical device for forming the holograms 29 is shown in FIG. 5. This device comprises an unexposed photographic emulsion 45 applied to a base 50 having dimensions slightly greater than the disc to be pressed. A prism unit is placed above an area VW of the emulsion 45. It comprises two prisms 48 and 49 having a common semi-transparent face for reflecting a parallel light beam 47 and direct it at normal incidence onto the emulsion 45. Above the prism unit 48, 49 there is disposed an object illuminated by a light beam 46 which is emitted, in the same way as the beam 47, by a source of coeherent radiation.

The object is constituted by one of the diapositives 53 or 54 on which have been previously recorded spiral tracks of non-uniform transparency which may, or may not, carry an optical modulation.

When one of the objects 53 or 54 is placed in position, the point Q or the point R representing one of the spires of the recorded spiral furnishes to the area VW of the emulsion 45 an illumination which interferes with the reference radiation of the beam 47. The interference fringes thus produced produce the exposure of the emulsion 45. After developing, the emulsion 45 furnishes the hologram of the object 53. By illuminating the hologram thus produced in the upward direction with a beam of the same type as the reference beam 47, there is obtained a real image of the object which had served to form the hologram.

To reconstruct the images of the two objects 53 and 54 from the same hologram, two successive exposures must be made, one with the object 53 alone and the other with the object 54 alone.

In the foregoing description, the objects 53 and 54 are in the form of diapositives on which spiral tracks have been recorded. These diapositive are produced in accordance with a technique of recording on photographic plates having a high resolution. The signal to be stored in usually an electrical signal coming for example from a video tape recorder or a television camera. This signal is recorded on a plane disc coated with a photosensitive layer by means of an apparatus comprising essentially: mechanical means for rotating the disc about an axis perpendicular to its plane, means for focusing onto the disc a beam of energy or particles capable of printing an image on the photosensitive layer, and means for shifting the point of impact of the beam relative to the disc so that this printing is effected in accordance with a spiral.

The means for focusing the beam onto the disc comprise a modulating device to which the electrical signal to be recorded is applied. The rotation of the disc about its axis must be effected in synchronism with the recorded signal, since the arrangement shown in FIG. 2. must be conformed to.

The disc printed by the aforementioned apparatus furnishes after developing and under the action of an incident uniform illumination a light track in the form of a spiral which can serve as an intermediate object in the formation of the holograms 29.

Figure 6:
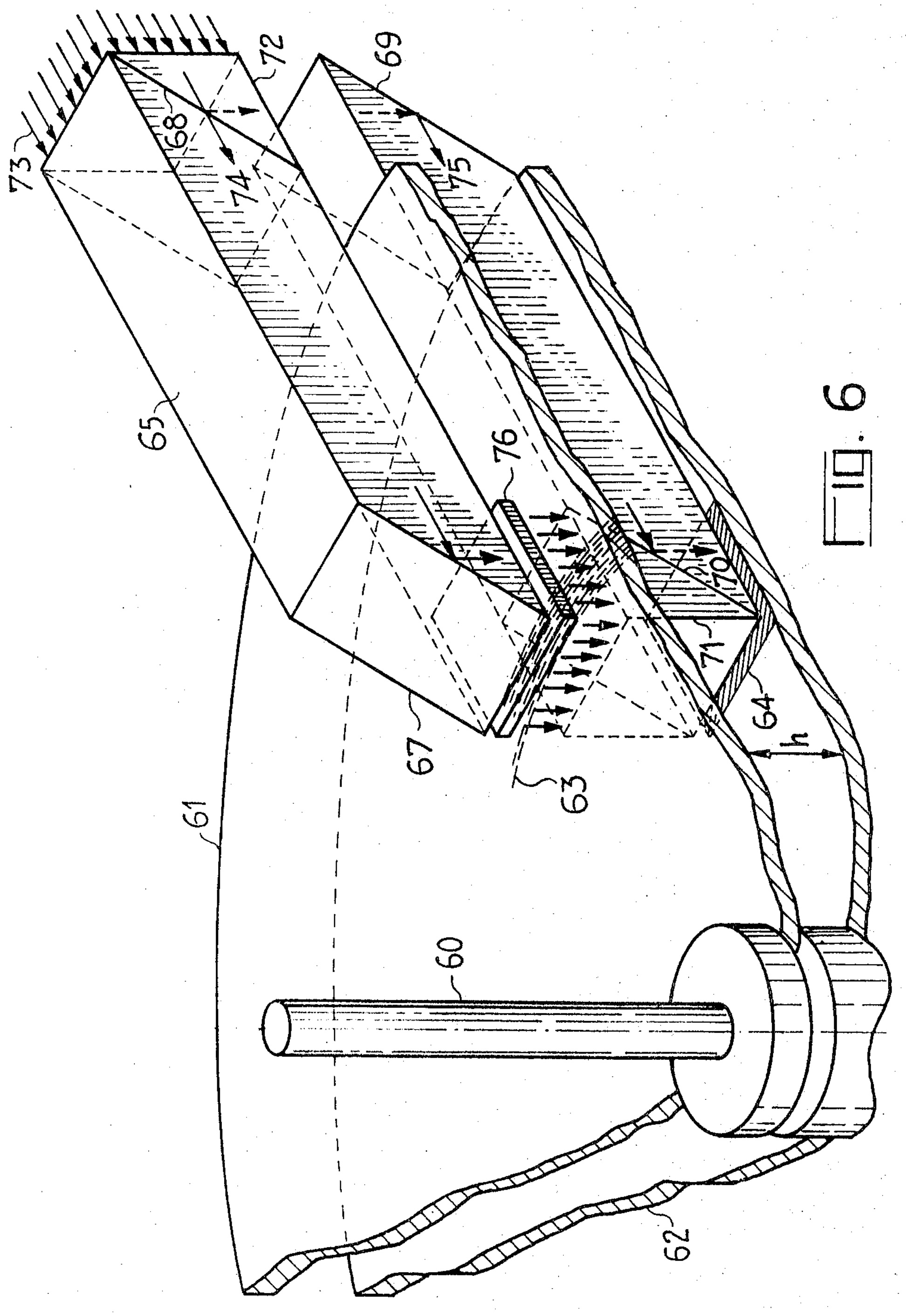
FIG. 6 is a perspective view of a device for recording the holograms carried by the disc shown in FIG. 1.

In FIG. 6 there can be seen a device for forming holograms according to the invention. It comprises a rotary spindle 60 to which is fixed an object disc 61 and a disc 62 carrying on its upper face an unexposed photographic emulsion. The object disc 61 comprises on its lower face the photographic recording of a spiral track, a few sections of successive spires 63 of which can be seen in dot-dash line. The cross-hatched zone 64 of the upper face of the disc 63 is that in which it is desired to form the hologram of the spire sections 63.

For this purpose, two transparent bars 65 and 66 are placed one above the other on each side of the disc 61. The bars 65, 66 have four oblique end faces 67, 68, 69 and 70 which are parallel to each other, the face 70 of the bar 66 carries a prism 71 and the face 68 of the bar 65 also carries a prism 72. A light radiation 73 is received by the input face of the prism 72 and is divided into transmitted and relected radiations 74 and 75 which pass respectively along the bars 65 and 66 toward the centre of the discs. The transmitted radiation 74 is reflected on the face 67 and passes successively through an optical diffuser 76 and the object disc 71. In this way, there is obtained a light image of the spire sections 63 and this image furnishes in turn a suitable illumination of the zone 64. The reflected radiation 75 also reaches the zone 64 after having been reflected on the semi-transparent face 70 so that the zone 64 is printed by the interference fringes which result from the superimposition of the object and reference waves. The device shown in FIG. 6 only shows a single object disc 61 located at a distance $h$ from rhe disc 62. To form holograms 64 capable of projecting light tracks at different heights, it is necessary to effect a first printing with the disc 61 then, after having removed it and replaced it by another, effect a second printing and so on. When the zone 64 has been suitably irradiated, it is possible to proceed to the printing of a neighbouring zone in accordance with the arrangement shown in FIG. 1. In order to ensure that the spire sections recorded on neighbouring zones 64 are perfectly interconnected, the discs 61 and 62 are maintained integral with each other. They are rotated together with respect to the bars 65 and 66. For each change in the orientation of the discs, the bars 65 and 66 are caused to slide jointly so that the successive prints form a spiral or a succession of concentric circular bands.

After having been printed, the emulsion carried by the disc 62 is developed so as to form thereon the holographic print intended for the pressing of the flexible discs. It is known that in the course of the developing the gelatine of the photographic emulsion undergoes a selective swelling which may be accentuated by a bleaching operation. This property explains the formation of a relief on the surface of the disc 62. This relief serves as a basis for the construction of a strong die similar to those produced in the phonograph field for pressing records. By means of such a die it is possible to form on a flexible sheet of deformable material a permanent print which is capable of reproducing the images of the light tracks described hereinbefore.

When it has been manufactured, the recording on the flexible disc can be reproduced by means of a reproducing apparatus, a typical embodiment of which is illustrated in FIG. 3.

The conditions under which the disc is reproduced are different from those chosen for constructing it. The print was formed on a plane surface for reasons of convenience and moreover, the object serving to construct the print is contained in a plane, as shown in FIG. 5. When the disc slides on the reproducing deck, the print curves when passing over the ridge of the roof and the curved print must be illuminated in such manner that it can give a clear image.

Figure 7:
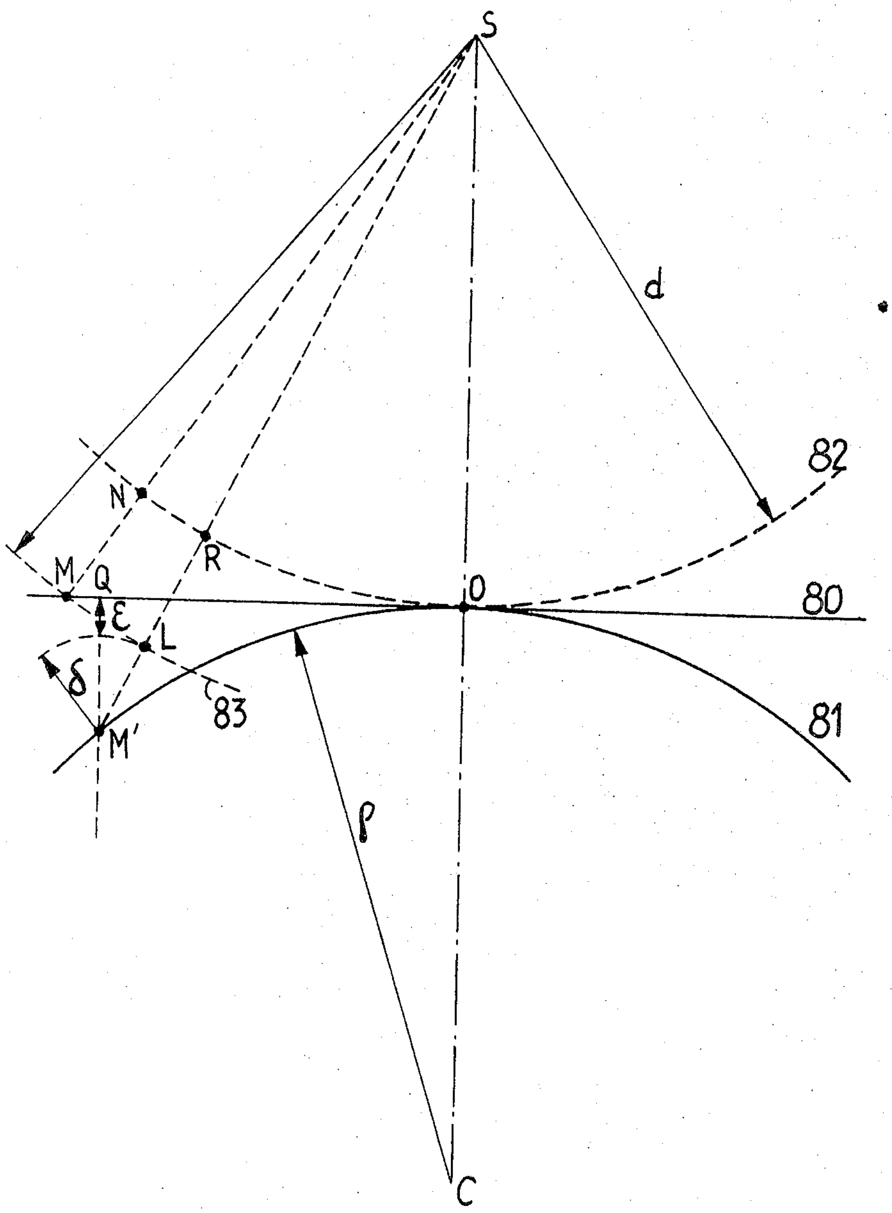
FIG. 7 is a diagram showing the distorsion introduced by the curvature of a hologram.

The diagram shown in FIG. 7 shows the rectilinear trace 80 of a plane hologram having a line of contact O with a cylindrical profile 81 have a radius $\rho$ and a centre C.

The plane hologram is assumed to be constructed in such manner as to project a real image when it receives a reference wave whose plane wavefronts are parallel thereto. Considering the point S of the projected image, it can be seen that this assumption implies that the wave diffracted by the hologram is a spherical wave intersecting the plane of FIG. 7 along an arc having a circumference 82. The energy fraction diffracted by the point M of the hologram 80 follows a path MS whose portion MN represents, to within a constant factor, the phase shift that the hologram created at the point M between this energy fraction and the plane wave of the illumination.

If it is now assumed that the same hologram 80 is applied against the profile 81, its point M occupies on the profile 81 the position M'. The energy fraction diffracted at M must now reach the point S along the path M'S. The arc having the circumference 83 centered on S and passing through M encounters the path M'S at the point L located at a distance M'L from the point M' and this distance M'L represents the additional distance $\sigma$ to be travelled through by the radiation diffracted at M'. On the other hand, owing to the curvature of the hologram, the point M' receives the illuminating wave with a phase lead which corresponds to the path M'Q. By taking into account the two changes, which are subtracted from each other, it can be seen that a phase lag of the wave which illuminates the curved hologram must be produced. This lag is proportional to the distance $\epsilon$ which increases as the distance from the point O increases.

A divergent cylindrical lens placed in the path of the plane wave illuminating the curved hologram enables the differences in the optical path resulting from the curvature of the hologram to be corrected.

This lens can be advantageously constituted by the transparent edge 30 along which the disc is reproduced.

The correction brought about in the reference beam by the divergent lens can also be provided when the holograms are formed. It can be assumed that the reproduction must be effected without correction by means of a plane reference wave. The correction must then be effected on the reference beam which served to form the holograms. This can be done by means of a correcting convergent lens having characteristics complementary to those of the divergent lens mentioned hereinbefore.

Whatever be the manner of correcting adopted for the purpose of projection a clear image above the holographic print carried by the flexible disc, it is necessary to read or reproduce in a punctual manner the spiral track which contains the image. This operation is facilitated by the fact that the track is located at a height which is perfectly defined with respect to the fixed elements of the reproducing deck. It is also facilitated by the judicious arrangement of the signals along the track since a sudden passage from one spire to another is with no apparent adverse effect as concerns the quality of the reproduced image.

As the pitch of the spiral is of the order of a few microns and as this spiral can have deformations or be out of centre relative to the rotary spindle of the reproducing deck, it is advantageous to provide a control of the position of the reproducer of the track carrying the information. In the case of the reproduction of phonograph discs or records, the control is easily achieved, since the point of reproduction or pickup bears in the groove. On the other hand, in the case of the present invention the reproducer has no contact with the disc and it is therefore necessary to guide it by means of a light track.

The light track, optically modulated by the stored electrical signal, is not always of utility as a guide means, since the recorded signal might have slow variations.

In order to achieve a sure guiding, it is necessary to employ a holographic print which projects at different heights two spiral tracks of identical form, the upper track being for example reserved for the storage of the information. The reproduction of the recording on a flexible disc having two tracks can then be achieved by means of the reproducing device diagrammatically illustrated in FIG. 8.

Figure 8:
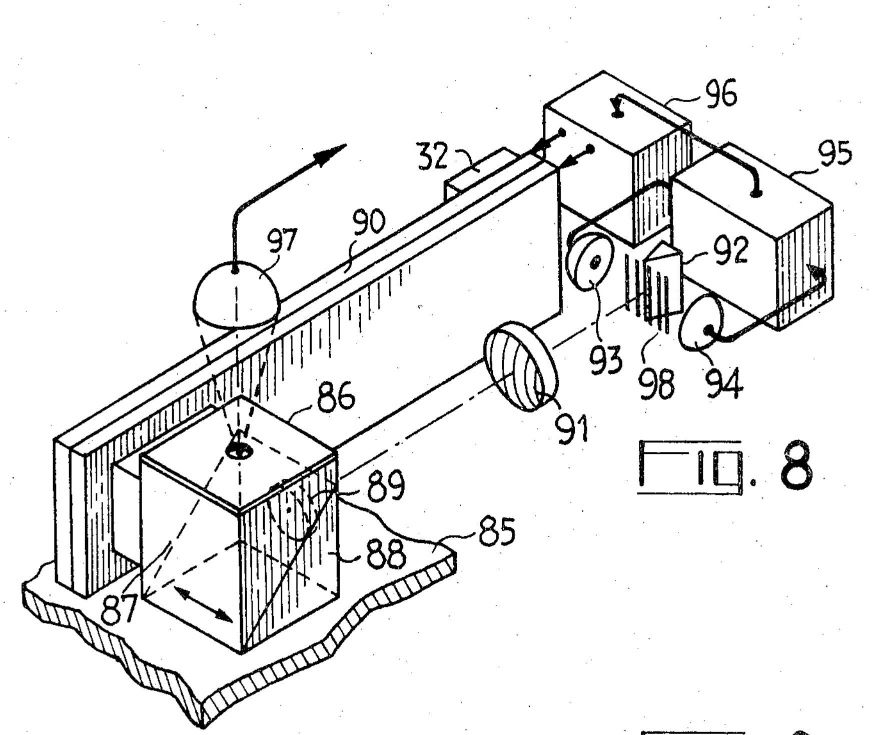
FIG. 8 is a perspective view of the photoelectric reproducing transducer and the device for causing the reproducing head to follow the information support track by means of a guide track.

FIG. 8 shows a portion of the flexible disc 85 whose print, when illuminated from below, projects upwardly a first track image located in the plane of the diaphragm 86 and a second track image parallel to the diaphragm 86 and located between the latter and the disc. A prism unit comprising prisms 87 and 88 has a semi-reflecting oblique face which transmits a fraction of the light coming from the disc 85 toward the diaphragm 86 and another fraction of this light toward an objective 89 integral with the prism unit. The prism unit 87, 88, the diaphragm 86 and the objective 89 are mounted at one end of an electromechanical transducer 90 the other end or which is integral with the stand 82. FIG. 8 also shows a photoelectric transducer 97 which receives the light transmitted through the orifice of the diaphragm 86. A projection lens 91 is disposed in such manner as to receive the magnified image of the lower track. The lens 91 projects a group of light bands 98 which are slightly set back from the edge of a prism 92. These light bands, which correspond to the spires of the lower track, are reflected laterally by the faces of the prism 92 as to excite two photoelectric transducers 93, 94 which are disposed symetrically on each side of the edge of the prism 92. The voltages delivered by the transducers 93 and 94 are applied to a subtracting circuit 95 which delivers an error voltage which is cancelled out when one of the light bands 98 symmetrically goes beyond the reflecting faces of the prism 92. The error voltage furnished by the subtractor 95 actuates a source of polarization 96 which excites the transducer 90.

The reproducing device shown in FIG. 8 is capable of maintaining the orifice of the diaphragm 86 on the upper light track projected by the disc 85. If the upper light track moves in the plane of the diaphragm 86, the lower light track also moves relative to the objective 89. Consequently, one of the light bands 98 no longer symmetrically straddles the edge of the prism 92 which creates an unbalance between the electrical signals delivered by the transducers 93 and 94. The subtractor 95 furnishes an error signal which, through the agency of the source 96, causes the prism unit 88, 89 to move in the direction of displacement of the light tracks. When the displacement of the prism unit has brought the orifice of the diaphragm back onto the light track, the error signal is cancelled out. The position control just described employs a lower guide track and an upper track carrying the information to be reproduced.

Without departing from the scope of the invention, it is possible to achieve the guiding and the reproduction by superimposing the tracks in the opposite direction. It is also possible to employ only a single track if the stored signal has a frequency spectrum completely situated above the maximum frequency at which the position control must operate. In this case, it is necessary to insert in the control loop a low-pass filter which can be interposed between the subtractor 95 and the source 96.

In the case of recording television programs on a flexible disc or record, the video frequency signal can be recorded on a main light track projected by the holographic print of the disc. The auxiliary light track acting as a guide for the track reproducer can also serve to record the sound signal which accompanies the video frequency signal. As the holographic print can project with no inconvenience more than two light tracks at different levels, two particular tracks may be employed for recording the stereophonic sound signals accompanying the images of the television program. Further, as the flexible disc is a means of broadcasting capable of interesting an international clientele it is possible to provide a plurality of light tracks at different levels carrying multi-language sound recordings without departing from the scope of the invention.

The flexible disc according to the invention may be constructed from a transparent material with a holographic print on a single face. The reproduction is achieved by illuminating it from below as shown in FIGS. 1, 3 and 4.

Without departing from the scope of the invention, it is also possible to make the flexible disc with one or two reflecting prints. The reference beam necessary for reproducing the recording of the disc must then illuminate the latter from above.

Figure 9:
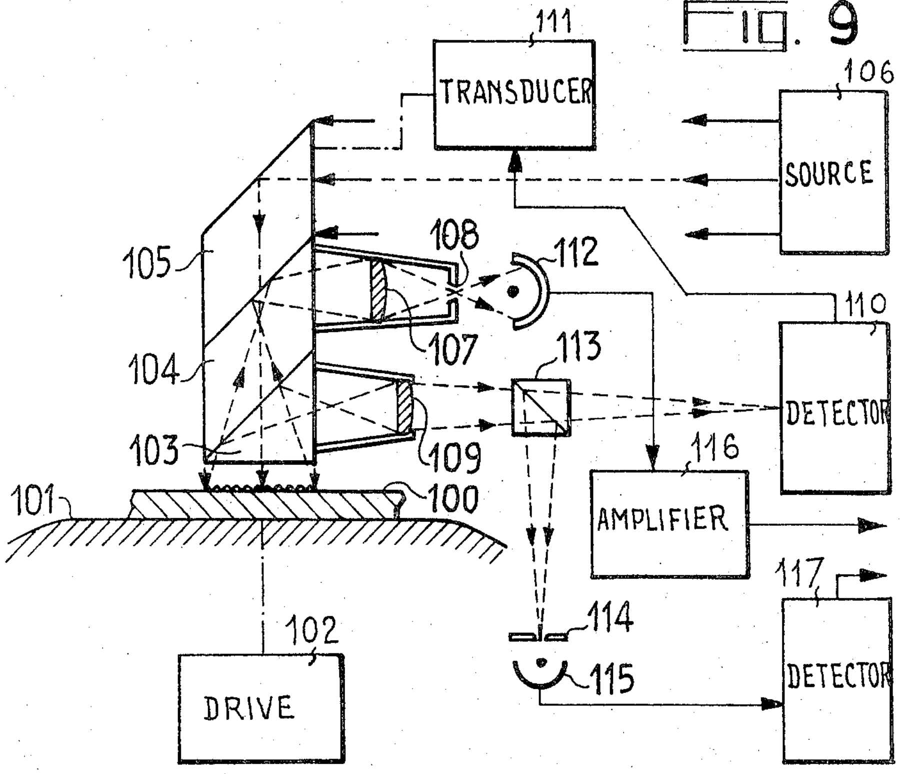
FIG. 9 is a diagram of a reproducing device employing the radiation reflected by the surface of the disc.

This modification has been diagrammatically shown in FIG. 9. There can be seen a portion of flexible disc 109 bearing on a reproducing deck whose ridge 101 has a flattened profile in the reproducing zone. A prism unit comprising three elements 103, 104 and 105 reflects in its upper part a reference beam coming from a source of coherent radiation 106. The reflected radiation travels through two semi-reflecting oblique faces and falls vertically onto the reflecting holographic print carried by the disc 100. Under the action of the incident radiation, the print projects two track images upwardly. The light which issues from these projected images inside the unit is reflected on the two semi-reflecting oblique faces. Objectives 107 and 109 attached to the elements 104 and 103 of the prism unit project the two internal images out of the prism unit so that one thereof coincides with the diaphragm 108 and the other with the image plane of a displacement detecting device 110.

The photoelectric transducer 112 placed at the outlet of the diaphragm 108 delivers a variable electrical signal when the disc 100 slides under the action of the drive mechanism 102. This signal is applied to an amplifier 116 which has its output connected to the output terminals of the reproducing deck. The error signal delivered by the detector 110 acts on an electromechanical transducer 111 which corrects at every instant the deviations in the positions of the light tracks relative to the prism unit. The lower light track which serves to guide the prism unit can be modulated optically by means of a subcarrier which is itself modulated by a low-frequency signal such as the light signal which accompanies the images of a television program. In order to detect this subcarrier a fraction of the beam issuing from the objective 109 is taken off by means of a beam separator 113. A diaphragm 114 associated with a photoelectric detector 115 then enables this subcarrier to be detected and applied to a detector 117 at the output of which the low-frequency signal is received.

It must be mentioned that the invention is not intended to be limited to systems recording and reproducing black and white television signals. The recording of colour television signals is also possible, since the luminance signals and the chrominance signals can be superimposed when recording on the disc and separated in the known manner after the reproduction.

Of course, the invention is not limited to the embodiment described and shown which was given solely by way of example.

What is claimed, is:

1. An electro-optical reproducing system for producing an electrical signal from a flexible record disc having two faces and carrying on at least one of said faces stored information relating to an electrical signal, said stored information being in the form of holographic print in relief occupying a circular area of said disc, said print comprising a mosaic of holograms capable of producing by diffraction of a monochromatic radiation directed thereon at least one fixed image which is contained in a plane parallel to the face of said disc opposed to said one face and comprises a track extending in the form of a spiral about a centre and forms a unidimensional distribution of radiation intensities representative of the form of said electrical signal; said reproducing system comprising: a deck in the form of a roof having two sloping faces defining a ridge extending along a line, a driving spindle extending through said deck and mounted to rotate about an axis intersecting said line of said ridge, mechanical connecting means for combining said disc with said spindle so as to be rotated by said spindle, means for rotating said disc and said spindle at constant speed relative to said deck about said axis, means for emitting a monochromatic radiation for illuminating a zone of the print of said disc located above said ridge, a diaphragm provided with an orifice, photoelectric means disposed to receive through said orifice a portion of the energy diffracted by the illuminated zone of said print, and mechanical means for displacing said diaphragm along said line of said ridge in synchronism with the rotation of said spindle, whereby the orifice of said diaphragm coincides at each instant with the axis of the spiral track projected by said disc.

2. An electro-optical system as claimed in claim 1, wherein said ridge has a part-cylindrical upper face.

3. An electro-optical reproducing system as claimed in claim 1, comprising a total reflection prism movable along said ridge by said mechanical shifting means, said radiation being reflected under said ridge by said total reflection prism.

4. An electro-optical reproducing system as claimed 1, wherein said photo-electric means are for connection to the input of a television set, the speed of rotation of said spindle being at synchronism with the frequency of the ac mains supplying said television set.

5. An electro-optical reproducing system as claimed in claim 1, wherein said ridge is composed of a material capable of transmitting said monchromatic radiation.

6. An electro-optical reproducing system as claimed in claim 5, wherein said ridge is defined by divergent part-cylindrical lens.

7. An electro-optical reproducing system as claimed in claim 1, comprising means associated with said diaphragm for controlling the position of said diaphragm in accordance with the position of at least one track projected by said disc.

8. An electro-optical reproducing system as claimed in claim 7, wherein said control means comprise an electromechanical transducer connected to said diaphragm and capable of shifting said diaphragm in its plane.

9. An electro-optical reproducing system as claimed in claim 1, comprising a prism unit having at least one semi-reflecting oblique face for receiving the diffracted radiation from the print carried by the disc.

10. An electro-optical reproducing system as claimed in claim 9, wherein said prism unit comprises two semi-reflecting and parallel oblique faces.

11. An electro-optical reproducing system as claimed in claim 9, wherein said prism unit comprises a reflecting face parallel to said oblique face, said monochromatic radiation being reflected by said reflecting face in the direction of said print.

12. An electro-optical reproducing system as claimed in claim 9, comprising an optical separating device for receiving said radiation from said semi-reflecting face and producing a first beam and a second beam, an opto-electrical displacement detector for receiving said first beam, and a diaphragm associated with a photo-electric transducer for receiving said second beam.

* * * * *